United States Patent
Gerth

(10) Patent No.: US 12,285,305 B2
(45) Date of Patent: Apr. 29, 2025

(54) COMPENSATING DEVIATIONS USING A FULL MANUFACTURING RESULT

(71) Applicant: EXOCAD GMBH, Darmstadt (DE)

(72) Inventor: Maik Gerth, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 621 days.

(21) Appl. No.: 17/463,661

(22) Filed: Sep. 1, 2021

(65) Prior Publication Data

US 2023/0062286 A1 Mar. 2, 2023

(51) Int. Cl.
| | |
|---|---|
| *A61C 13/00* | (2006.01) |
| *A61C 9/00* | (2006.01) |
| *B33Y 10/00* | (2015.01) |
| *B33Y 30/00* | (2015.01) |
| *B33Y 50/00* | (2015.01) |
| *B33Y 80/00* | (2015.01) |
| *G05B 19/4097* | (2006.01) |
| *G06V 10/774* | (2022.01) |

(52) U.S. Cl.
CPC .......... *A61C 13/0019* (2013.01); *A61C 9/004* (2013.01); *A61C 9/0053* (2013.01); *A61C 13/0004* (2013.01); *B33Y 10/00* (2014.12); *B33Y 30/00* (2014.12); *B33Y 50/00* (2014.12); *B33Y 80/00* (2014.12); *G05B 19/4097* (2013.01); *G06V 10/774* (2022.01)

(58) Field of Classification Search
CPC .............. Y02P 90/02; G05B 19/41805; G05B 19/4099; G05B 19/4207; G05B 2219/45055; G05B 19/41875; G05B 2219/37212; G05B 2219/45064; G05B 19/40931; G05B 19/4093; G05B 2219/32212; G05B 2219/32232; G05B 2219/32233; G05B 2219/35062; G05B 2219/35134; G05B 2219/37593; G05B 2219/37617; G05B 2219/39149; G06T 2219/2004; G06T 2219/2021; A61C 13/0004; A61C 9/0053; G01N 29/225
See application file for complete search history.

(56) References Cited

U.S. PATENT DOCUMENTS

| | | | | |
|---|---|---|---|---|
| 5,956,251 | A * | 9/1999 | Atkinson | G07C 3/14 700/109 |
| 6,163,946 | A * | 12/2000 | Pryor | B25J 9/1697 29/702 |
| 6,721,444 | B1 * | 4/2004 | Gu | G06T 7/97 382/218 |
| 7,239,991 | B2 * | 7/2007 | Tuszynski | G05B 17/02 703/2 |
| 9,050,719 | B2 * | 6/2015 | Valpola | B25J 13/085 |
| 2003/0163212 | A1 * | 8/2003 | Smith | G06Q 10/06 700/95 |
| 2010/0304334 | A1 * | 12/2010 | Layton | A61C 8/005 433/201.1 |

(Continued)

*Primary Examiner* — Darrin D Dunn
(74) *Attorney, Agent, or Firm* — PERRY + CURRIER INC.

(57) ABSTRACT

The invention relates to a method for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element.

36 Claims, 7 Drawing Sheets

(56) References Cited

U.S. PATENT DOCUMENTS

| | | | |
|---|---|---|---|
| 2015/0254376 A1* | 9/2015 | Pettersson | G06F 30/13 |
| | | | 703/1 |
| 2016/0109876 A1* | 4/2016 | Addicott | G05B 19/401 |
| | | | 700/98 |
| 2019/0294743 A1 | 9/2019 | Ajiri et al. | |
| 2019/0318479 A1 | 10/2019 | Ajiri et al. | |
| 2020/0078143 A1 | 3/2020 | Schulter et al. | |
| 2021/0086363 A1* | 3/2021 | Stertkamp | G05B 19/41805 |
| 2021/0097212 A1 | 4/2021 | Schonenberger | |
| 2021/0295492 A1* | 9/2021 | Link | G06T 7/344 |
| 2022/0392042 A1* | 12/2022 | Beauchemin | G06T 7/337 |

* cited by examiner

COMPENSATING DEVIATIONS USING A FULL MANUFACTURING RESULT

The invention relates to the field of dental technology. More particularly, the invention relates to a method for manufacturing a dental prosthetic assembly. The invention furthermore relates to a computer program product and a manufacturing system for manufacturing a dental prosthetic assembly.

In dental technology, there are several types of dental prosthetic assemblies comprising elements, which have to fit over each other precisely. Such an assembly may, e.g., comprise a superstructure, like a crown, which has to fit on a base, like an abutment, in a precise, predefined manner. When manufacturing such an assembly, in particular when using rapid prototyping techniques, deviations may occur, due to manufacturing inaccuracies. Such deviations may, e.g., result in a blocking of the superstructure, when being push onto the base, a misaligned fit of the superstructure on the base, or a loose fit providing insufficient support for the superstructure by the base. Such manufacturing inaccuracies may, e.g., occur, when manufacturing the base as well as when manufacturing the superstructure.

It is an objective to provide for a method, a manufacturing system and computer program product for manufacturing a dental prosthetic assembly.

In one aspect, the invention relates to a method for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element.

The method comprises providing a first 3D digital model of the first element as a first template and a second 3D digital model of the second element as a second template. A first physical copy of the first element is manufactured using the first template and a second physical copy of the second element using the second template. Scan data of the manufactured first and second physical copy is acquired. A first 3D digital scan model of the manufactured first physical copy and a second 3D digital scan model of the manufactured second physical copy are provided using the scan data. Using the first and second scan model deviations of the mechanical connection violating one or more fitting criteria are determined, when replacing the templates by the scan models for establishing the mechanical connection. The determined deviations of the mechanical connection are compensated to satisfy the one or more violated fitting criteria. The compensating comprises at least one of the following: modifying the first template and modifying the second template. The one or more modified templates are used for providing one or more modified physical copies.

Examples may have the beneficial effect of using an analysis of the manufactured physical copies for determining modifications in order to ensure a precise mechanical connection between the two physical copies. By using scan data of both physical copies, effects and in particular mutual dependences of manufacturing inaccuracies of both physical copies may be taken into account. For example, manufacturing inaccuracies of the two physical copies may aggravate each other or may compensate each other. Thus, by using scan models of both physical copies, the effects of both physical copies on the mechanical connection, which is depending on both physical copies, may be assets. Based on this assessment, derivations violating a fitting criterium may be compensated.

Depending on the deviations, e.g., on the size, form and/or location of the deviation, the first and/or the second template may be modified in order to compensate the deviations determined to violate a fitting criterium. In case one modified template is provided, the physical copy manufactured using the respective template may be modified using the modified template. In case two modified templates are provided, the two modified templates may be used to modify both manufactured physical copies.

Examples may have the beneficial effect of enabling of a fast manufacturing of the assembly, since the two physical copies may at least temporarily be manufactured simultaneously.

The providing of the first and second 3D digital models may comprise generating the first 3D digital model of the first element as the first template and the second 3D digital model of the second element as the second template.

Computer-aided design (CAD) may be used for generating, modifying, analyzing, and/or optimizing the digital 3D models of dental prosthetic assemblies. The digital 3D models may define geometrical forms of objects, e.g., surfaces of those 3D objects. Furthermore, for manufacturing physical copies of the digital 3D models defined using CAD computer-aided manufacturing (CAM) may be used to control manufacturing devices, e.g., machining devices and/or 3D printing devices, to manufacture physical copies defined by the digital 3D models, which are used as templates.

For example, artificial intelligence (AI) capabilities may be used to compensate the determined deviations of the mechanical connection. The AI capabilities may, e.g., comprise a trained machine learning model. Such a trained machine learning model may be provided for compensating deviations of the mechanical connection. The compensating may comprise modifying one or more of the templates used for manufacturing the physical copies.

The trained machine learning model may be configured for making a prediction of one or more modified templates, i.e., a modification of the templates used for manufacturing the physical copies, such that the one or more violated fitting criteria are satisfied.

The 3D digital scan models and the templates used for manufacturing the physical copies may be provided as input to the trained machine learning model. In response to the providing of the input, a prediction of one or more modified templates may be received from the trained machine learning model as an output. This output, i.e., the one or more modified templates, may be used for providing one or more modified physical copies.

In order to provide the trained machine learning model for compensating deviations of the mechanical connection, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise 3D digital scan models of manufactured physical copies and templates used for manufacturing the respective physical copies. Each training output may comprise a modification of one or more of the templates provided as input. The untrained machine-learning model is trained using the training data to provide the training output as a prediction of a compensation in response to receiving the training input of the respective training dataset, thereby creating the trained model. The trained machine learning model may then be provided for making predictions of modified templates for providing physical copies as described herein.

The term "machine learning" (ML) refers to a computer algorithm used to extract useful information from training data sets by building probabilistic models, which are referred to as machine learning models or predictive models, in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning model may, e.g., be a data structure or program such as a neural network, in particular a convolutional neural network, a support vector machine, a decision tree, a Bayesian network etc. The machine learning model may be adapted to predict an unmeasured value, e.g., a modification of a template for an element of a dental prosthetic assembly from other, known values, e.g., scan models of manufactures physical copies and templates used for manufacturing the respective physical copies. According to an example, the machine learning model is a deep learning model.

For example, artificial intelligence (AI) capabilities may further be used for the determining deviations of the mechanical connection violating the one or more fitting criteria. The AI capabilities may, e.g., comprise a trained machine learning model. Such a trained machine learning model may be provided for determining the deviations of the mechanical connection violating the one or more fitting criteria.

The trained machine learning model may be configured for making a prediction of deviations violating one or more fitting criteria. The 3D digital scan models may be provided as input to the trained machine learning model. In response to the providing of the input, a prediction of the deviations violating one or more of the fitting criteria may be received from the trained machine learning model as an output. This output, i.e., the determination of the deviations violating one or more of the fitting criteria, may be used for modifying one or more templates in order to compensate the determined deviations.

In order to provide the trained machine learning model for determining deviations violating fitting criteria, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise two 3D digital scan models of manufactured physical copies. Each training output may comprise a determination of deviations of the mechanical connection violating fitting criteria. The untrained machine-learning model is trained using the training data to provide the training output as a prediction of deviations violating fitting criteria in response to receiving the training input of the respective training dataset, thereby creating the trained model. The trained machine learning model may then be provided for making predictions of deviations of mechanical connections violating fitting criteria as described herein.

The machine learning model may thus be adapted to determine a value, e.g., a deviation violating a fitting criterium from other, known values, e.g., scan models of manufactured physical copies. According to an example, the machine learning model is a deep learning model.

For example, a determination of one or more deviations violating one or more fitting criteria may be executed by the machine learning model, when predicting, modifications of one or more templates as output in response to receiving 3D digital scan models of manufactured physical copies and one or more template as input.

For example, the providing of the one or more modified physical copies comprises re-manufacturing at least one of the manufactured physical copies, for which the template is modified, using the respective modified template.

A re-manufacturing of one or more of the physical copies may, e.g., be executed, in case that it may not be possible to compensate deviations determined solely by modifying the manufactured physical templates. Such a modifying may, e.g., comprise a subsequent machining. However, in case material has to be added rather than removed, a re-manufacturing may be required. For example, a compensation by removing material may result in a weakening of the physical copy being modified. Such a weakening may, e.g., occur in case the modification results in a material thickness, e.g., wall thickness, falling below a predefined threshold. In order to be able to maintain a required material thickness and remove material at the same time, may require a re-manufacturing. For the re-manufacturing a modified template may be used, which defines a material reduction at the required position, while at the same time the material thickness may be maintained by adding material at a position to the position, where the material is removed.

Furthermore, such a modification using material removal may result in an insufficient support provided by the second physical copy for the first physical copy, when establishing the mechanical connection. Such problems may be resolved by re-manufacturing the first and/or the second physical copy using modified first templates. In case an adding of material may not be possible, e.g., in case machining being used to manufacture the physical copy to be modified, a re-manufacturing of the respective physical copy may be required. For example, a new blank may be provided and the respective physical copy may be re-manufactured using a modified template.

For example, a compensation of the deviations may require a modification of a relative position and/or orientation between the first and the second element, when establishing the mechanical connection. A modification of the relative position and/or orientation between the first and the second element may require a modification of both physical copies, i.e., the second physical copy to be manufactured and the first physical copy already manufactured. For example, a modification of the first physical copy may require a re-manufacturing of the For example, the providing of the one or more modified physical copies comprises determining machining parameters for a subsequent machining of at least one of the manufactured physical copies, for which the template is modified, using the respective modified template, and subsequent machining of at least one of the manufactured physical copies, for which the template is modified, using the determined machining parameters.

Examples may have the beneficial effect that a modification of physical copies may be implemented by a subsequent machining of the manufactured physical copies to be modified. The respective physical models may, e.g., have been manufactured using machining or 3D printing. Thus, a re-manufacturing may, e.g., be avoided. Avoiding a re-manufacturing may have the beneficial effect that a subsequent machining may, e.g., be faster than a re-manufacturing and material may be saved.

For example, for the subsequent machining of the at least one of the manufactured physical copies the same machining tool is used as for the manufacturing of the respective physical copy.

For example, for the subsequent machining of the first physical copy a different machining tool is used with a reduced size compared to the machining tool used for the manufacturing of the respective physical copy.

Examples may have the beneficial effect that using a machining tool with a reduced size, i.e., a finer tool, may enable a higher precision of the machining. Using a machining tool with a larger size, i.e., a coarser tool, may enable a faster manufacturing of the respective physical copy. Using a finer tool only for modifying the manufactured physical copy, i.e., for a subsequent machining, may allow for a faster manufacturing due to the coarser tool used before as well as a fine shaping of the surface of the respective physical copy by the subsequent machining.

For example, the mechanical connection, when being established, defines a relative position of the second element with respect to the first element. The fitting criteria comprise a first maximum value for deviations of the second element from the defined relative position.

Examples may have the beneficial effect that by modifying the second and/or first template the relative position between the two elements of the dental prosthetic assembly may be adjusted such that any deviations of the relative position are, e.g., within a predefined range. The relative position between the two elements may, e.g., define a position, in particular a visible position, of at least one of the elements in a patient's mouth, when implementing the dental prosthetic assembly therein. For example, in case of an abutment and a crown, the relative position between the abutment and the crown, may define the position of the crown within a patient's mouth with the abutment or an implant, on which the abutment is mounted, as a point of reference.

For example, the mechanical connection, when being established, defines a relative orientation of the second element with respect to the first element. The fitting criteria comprise a second maximum value for deviations of the second element from the defined relative orientation.

Examples may have the beneficial effect that by modifying the second and/or first template the relative orientation between the two elements of the dental prosthetic assembly may be adjusted such that any deviations of the relative orientation are, e.g., within a predefined range. The relative orientation between the two elements may, e.g., define an orientation, in particular a visible orientation, of at least one of the elements in a patient's mouth, when implementing the dental prosthetic assembly therein. For example, in case of an abutment and a crown, the relative orientation between the abutment and the crown, may define the orientation of the crown within a patient's mouth with the abutment or an implant, on which the abutment is mounted, providing a point and/or direction of reference.

For example, the determining of the deviations of the mechanical connection is restricted to selected sections of the mechanical connection comprising one or more of the following: a set of one or more selected first sections of the first connection portion, a set of one or more selected second sections of the second connection portion.

Examples may have the beneficial effect of only taking selected sections of the mechanical connection into account for an analysis of deviations and thus modifications. Thus, depending on the sections being selected, the analysis may, e.g., be executed faster and focused on sections influencing the mechanical connection, e.g., a relative position and/or orientation of the connected element, potentially the most. For example, when inserting a protrusion into a reception, a top section of the protrusion may be of less relevance than lateral surfaces facing of the protrusion inner surfaces of the reception and/or a rim extending around a bottom of the protrusion and defining an insertion depth of the protrusion into the reception.

For example, the selected one or more first sections cover the entire first connection portion. Examples may have the beneficial effect that the entire first connection portion may be taken into account, when determining deviations violating fitting criteria.

For example, the selected one or more first sections cover one or more sub-portions of the first connection portion with one or more sub-portions of the first connection portion remaining uncovered. Examples may have the beneficial effect that only a part of the first connection portion may be taken into account, when determining deviations violating fitting criteria.

For example, the selected one or more second sections cover the entire second connection portion. Examples may have the beneficial effect that the entire second connection portion may be taken into account, when determining deviations violating fitting criteria.

For example, the selected one or more second sections cover one or more sub-portions of the second connection portion with one or more sub-portions of the second connection portion remaining uncovered. Examples may have the beneficial effect that only a part of the first connection portion may be taken into account, when determining deviations violating fitting criteria.

For example, the selected first and second sections are selected pairwise. The first and second section of each pair comprise a first and second surface facing each other. Examples may have the beneficial effect that the relative influence, e.g., a relative position and/or relative orientation, of surfaces of the two elements facing each other may be take into account, when determining deviations violating fitting criteria. For example, only sections of surface facing each other may be taken into account.

For example, image pattern recognition is used for selecting the first and second sections. The image pattern recognition is one of the following: a 2D image pattern recognition, a 3D image pattern recognition. Examples may have the beneficial effect that using image pattern recognition, specific surfaces and/or sections of the manufactured physical copies resembled by the scan data may be identified. Thus, surfaces of the manufactured first physical copy defined by the scan data facing surfaces of the manufactured second physical model defined by the scan data may be determined.

For example, the mechanical connection, when being established, defines a clearance between the first and second connection portion. The fitting criteria comprise a minimum value of the clearance. Examples may have the beneficial effect that a sufficiently large clearance, at least between selected sections of the connection portions, may be ensured. A sufficient clearance may ensure that the first element fits over the first element. A sufficient clearance may further ensure, that sufficient space may be provided for an adhesive, like a dental cement, to be inserted into the clearance. Such an adhesive may be used to implement a bonding between the elements.

The mechanical connection may, e.g., be a connection such that the second element is non-destructively detachable from the first element of the dental prosthetic assembly. Even in case of using an adhesive to establish the mechanical connection, the second element may be detachable from the first element of the dental prosthetic assembly using suitable measures.

For example, deviations of the mechanical connection with respect to the clearance are determined between the selected first and second sections of the templates. Examples may have the beneficial effect the clearance only between selected sections may be taken into account. In sections, which are less important or less error-prone, the minimum size of the clearance may not be taken into account as a fitting criterium.

For example, the fitting criteria further comprise a maximum value of the clearance. Examples may have the beneficial effect that it may be ensured that the clearance does not become too large. A too large clearance may, e.g., may result in a loose fit of the first element on the second element, i.e., an insufficient support of the first element by the second element.

For example, the method further comprises determining using the acquired scan data deviations of the manufactured first physical copy from the first template violating the fitting criteria. The fitting criteria further comprise a first maximum value of the deviations of the manufactured first physical copy.

Examples may have the beneficial effect that it may be ensured that the manufactured first physical copy only comprises deviations from the template used to manufacture the first physical copy within a predefined range, i.e., up to the maximum value. Thus, the manufactured first physical copy per se may be checked by comparing the scan model with the template used for manufacturing the first physical copy. In case of deviations exceeding a predefined threshold, i.e., the maximum value, the manufactured first physical copy may, e.g., be modified in order to compensate the deviations. For example, modifying the first physical copy may comprise a subsequent machining or re-manufacturing of the manufactured first physical copy.

For example, the determining of the deviations violating the first maximum value is restricted to one or more selected third sections of the first template.

Examples may have the beneficial effect of only taking selected sections of the manufactured first physical copy into account for an analysis of deviations and thus modifications. Thus, depending on the sections being selected, the analysis may, e.g., be executed faster and focused on sections influencing the mechanical connection, e.g., a relative position and/or orientation of the connected element, potentially the most. Sections of the manufactured first physical copy not relevant for the mechanical connection with the second physical copy may, e.g., be neglected. For example, surfaces of the first physical copy facing away from the second physical copy, when establishing the mechanical connection, may be neglected. For example, inner structures within the first physical copy, like, e.g., a screwing channel configured for receiving a screw used to mount the dental prosthetic assembly on a manufactured first physical copy implant may be neglected.

For example, for the determining of the deviations first scan data of the selected third sections of the manufactured first physical copy is selected from the acquired scan data.

Examples may have the beneficial effect that only scan data resembling relevant sections may, e.g., be taken into account. The relevant scan data may, e.g., be selected using the scan model. The scan model may be provided and from the scan model, relevant section, i.e., relevant scan data may be selected.

For example, image pattern recognition is used for selecting the first scan data. The image pattern recognition is one of the following: a 2D image pattern recognition, a 3D image pattern recognition.

Examples may have the beneficial effect that using image pattern recognition, specific surfaces and/or sections of the scan data, e.g., of the scan model, may be identified. Thus, relevant surfaces of the manufactured first physical copy defined by the scan data may be determined.

For example, the method further comprises determining using the acquired scan data deviations of the manufactured second physical copy from the second template violating the fitting criteria. The fitting criteria further comprise a second maximum value of the deviations of the manufactured second physical copy.

Examples may have the beneficial effect that it may be ensured that the manufactured second physical copy only comprises deviations from the template used to manufacture the second physical copy within a predefined range, i.e., up to the maximum value. Thus, the manufactured second physical copy per se may be checked by comparing the scan model with the template used for manufacturing the second physical copy. In case of deviations exceeding a predefined threshold, i.e., the maximum value, the manufactured second physical copy may, e.g., be modified in order to compensate the deviations. For example, modifying the second physical copy may comprise a subsequent machining or re-manufacturing of the manufactured second physical copy.

For example, the determining of the deviations violating the second maximum value is restricted to one or more selected fourth sections of the second template.

Examples may have the beneficial effect of only taking selected sections of the manufactured second physical copy into account for an analysis of deviations and thus modifications. Thus, depending on the sections being selected, the analysis may, e.g., be executed faster and focused on sections influencing the mechanical connection, e.g., a relative position and/or orientation of the connected element, potentially the most. Sections of the manufactured second physical copy not relevant for the mechanical connection with the second physical copy may, e.g., be neglected. For example, surfaces of the second physical copy facing away from the second physical copy, when establishing the mechanical connection, may be neglected. For example, inner structures within the second physical copy, like, e.g., a screwing channel configured for receiving a screw used to mount the dental prosthetic assembly on a manufactured second physical copy implant may be neglected.

For example, for the determining of the deviations second scan data of the selected fourth sections of the manufactured second physical copy is selected from the acquired scan data.

Examples may have the beneficial effect that only scan data resembling relevant sections may, e.g., be taken into account. The relevant scan data may, e.g., be selected using the scan model. The scan model may be provided and from the scan model, relevant section, i.e., relevant scan data may be selected.

For example, image pattern recognition is used for selecting the second scan data. The image pattern recognition is one of the following: a 2D image pattern recognition, a 3D image pattern recognition.

Examples may have the beneficial effect that using image pattern recognition, specific surfaces and/or sections of the scan data, e.g., of the second scan model, may be identified. Thus, relevant surfaces of the manufactured second physical copy defined by the scan data may be determined.

For example, one or more of the fitting criteria are position depending. Examples may have the beneficial effect the type and/or size of the fitting criteria may be position depending. At specific positions of the first and/or second element, e.g., lager deviations may be allowed, while at other positions even small deviations may have a lager impact on the mechanical connection between the first and second physical copy. Therefore, at some positions stricter thresholds may be apply to deviations than at other positions. At different positions, different types of fitting criteria may apply. At some portions, e.g., minimum and maximum thresholds may apply, while at other positions, e.g., only a minimum or a maximum threshold may apply.

For example, the first and second connection portions comprise one or more of the following of the first and second connection portion: a ridge, a notch, a rim, an edge, a hole.

The protrusion and/or reception may comprise or be limited by a structure comprising a ridge, notch, rim, edge and/or hole. Such a structure may, e.g., be used to control a relative position and/or relative orientation between the first and second physical copy.

For example, the determining of the deviations comprises a registration of the first and second scan model with the first and second template.

Examples may have the beneficial effect that by registering the scan models with the templates used for the manufacturing of the physical copies, the respective templates may each be entirely or at least partially replaceable by the scan models, in order to determine the effects of manufacturing inaccuracies defined by the scan models on the mechanic connection.

For example, image pattern recognition is used for the registration of the first and second scan model with the first and second template. The image pattern recognition is one of the following: a 2D image pattern recognition, a 3D image pattern recognition. Examples may have the beneficial effect that using image pattern recognition, corresponding surfaces and/or sections of the scan models and the templates used for the manufacturing of the physical copies may be identified.

For example, the registration of the first scan model with the first template may be an ICP-registration, i.e., a registration using the iterative closest point algorithm to minimize the difference between two clouds of points. For example, the registration of the second scan model with the second template may be an ICP-registration.

For example, the first and second scan model are registered with the first and second template directly. Examples may have the beneficial effect that corresponding surfaces and/or sections of the scan models and the templates used for the manufacturing of the respective physical copies may be identified, based on which a direct registration may be implemented.

For example, the first and second scan model are registered with the templates indirectly. The indirect registration comprises defining a position of the first and second template within a fifth 3D digital model of at least a part of a dentition of a patient. The first and second scan model are arranged in the fifth 3D digital model at the predefined position within the fifth 3D digital model.

Examples may have the beneficial effect that an additional model may be used as a reference for positioning the scan models. By positioning the scan models at positions defined for the templates used for the manufacturing of the physical copies, an indirect registration may be implemented.

For example, the first and second template comprise markers. The first and second physical copies comprise copies of the markers. The markers are used for the registration of the scan model with the templates.

Examples may have the beneficial effect that using marker, a registration may be simplified. Using marker, e.g., no image pattern recognition at all or only an image pattern recognition restricted to the marker may be required.

For example, artificial intelligence (AI) capabilities may further be used for registration, in particular image-pattern-recognition-based registration. The AI capabilities may, e.g., comprise a trained machine learning model. Such a trained machine learning model may be provided for registering digital images or models. The digital images or models may, e.g., be 2D or 3D digital images or models.

The trained machine learning model may be configured for making a prediction of a registering a first digital image or model with a second digital image or model. The first digital image or model may be provided as input to the trained machine learning model. In response to the providing of the input, a prediction of a registration of the first digital image or model with a second digital image or model may be received from the trained machine learning model as an output. This output, i.e., the registration of the first digital image or model with the second digital image or model, may be used for manufacturing a dental prosthetic assembly as described herein.

In order to provide the trained machine learning model for registering a first digital image or model with a second digital image or model, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a first and a second digital image or model. Each training output may comprise a definition of a registration of the first digital image or model with the second digital image or model. The untrained machine-learning model is trained using the training data to provide the training output as a prediction of a registration of the first digital image or model with the second digital image or model in response to receiving the training input of the respective training dataset, thereby creating the trained model. The trained machine learning model may then be provided for making predictions of a registrations as described herein.

The machine learning model may thus be adapted to determine values, e.g., a registration of a first digital image or model with a second digital image or model from other, known values, e.g., the first and second digital image or model. According to an example, the machine learning model is a deep learning model.

For example, the first and second physical copy are manufactured using at least one of the following: machining, 3D printing. For machining, a blank may be provided from which material is removed using one or more machining tools. For 3D printing, a 3D printing device may be used to print the respective physical copy layer by layer.

For example, both physical copies may be manufactured using the same method or the two physical copies may be manufactured different methods.

For example, the second element is an abutment and the first element is one of the following: a crown, an abutment tooth of a bridge, an abutment tooth of a partial removable denture. Thus, the dental prosthetic assembly may comprise a crown, a bridge or a partial removable denture configured to be fixated in using an abutment.

For example, the second element is a bar and the first element is one of the following: a bar denture, a part of a bar denture. Thus, the dental prosthetic assembly may comprise a bar denture or part of a bar denture configured to be fixated in using a bar.

In another aspect, the invention relates to a computer program product for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element. The computer program product comprises a computer readable storage medium having program instructions embodied therewith.

The program instructions are executable by a processor of a computer device of a manufacturing system to cause the computer device to control the manufacturing system to provide a first 3D digital model of the first element as a first template and a second 3D digital model of the second element as a second template. A first physical copy of the first element is manufactured using the first template and a second physical copy of the second element using the second template. Scan data of the manufactured first and second physical copy is acquired. A first 3D digital scan model of the manufactured first physical copy and a second 3D digital scan model of the manufactured second physical copy are provided using the scan data. Using the first and second scan model deviations of the mechanical connection violating one or more fitting criteria are determined, when replacing the templates by the scan models for establishing the mechanical connection. The determined deviations of the mechanical connection are compensated to satisfy the one or more violated fitting criteria. The compensating comprises at least one of the following: modifying the first template and modifying the second template. The one or more modified templates are used for providing one or more modified physical copies.

The computer-readable program instructions of the computer program product may be configured for executing any of the aforementioned examples of a method for manufacturing a dental prosthetic assembly.

The providing of the first and second 3D digital models may comprise generating the first 3D digital model of the first element as the first template and the second 3D digital model of the second element as the second template.

In another aspect, the invention relates to a manufacturing system for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element. The manufacturing system comprises a computer device and one or more manufacturing devices. The computer device comprises a processor and a memory storing program instructions executable by the processor.

Execution of the program instructions by the processor causes the computer device to control the manufacturing system using the manufacturing device to provide a first 3D digital model of the first element as a first template and a second 3D digital model of the second element as a second template. A first physical copy of the first element is manufactured using the first template and a second physical copy of the second element using the second template. Scan data of the manufactured first and second physical copy is acquired. A first 3D digital scan model of the manufactured first physical copy and a second 3D digital scan model of the manufactured second physical copy are provided using the scan data. Using the first and second scan model deviations of the mechanical connection violating one or more fitting criteria are determined, when replacing the templates by the scan models for establishing the mechanical connection. The determined deviations of the mechanical connection are compensated to satisfy the one or more violated fitting criteria. The compensating comprises at least one of the following: modifying the first template and modifying the second template. The one or more modified templates are used for providing one or more modified physical copies.

The manufacturing system may be configured for executing any of the aforementioned examples of a method for manufacturing a dental prosthetic assembly.

The providing of the first and second 3D digital models may comprise generating the first 3D digital model of the first element as the first template and the second 3D digital model of the second element as the second template.

For example, the manufacturing devices comprise one or more of the following: a machining device, a 3D printing device. The machining device may be configured for removing material from a blank using one or more machining tools by machining. The 3D printing device may be configured to print physical copies layer by layer.

The above-described examples and embodiments may be combined freely as long as the combinations are not mutually exclusive.

In the following, embodiments of the invention are described in greater detail in which FIG. 1 shows a flowchart illustrating an exemplary method for manufacturing a dental prosthetic assembly;

In the following similar features are denoted by the same reference numerals.

Figure 1:
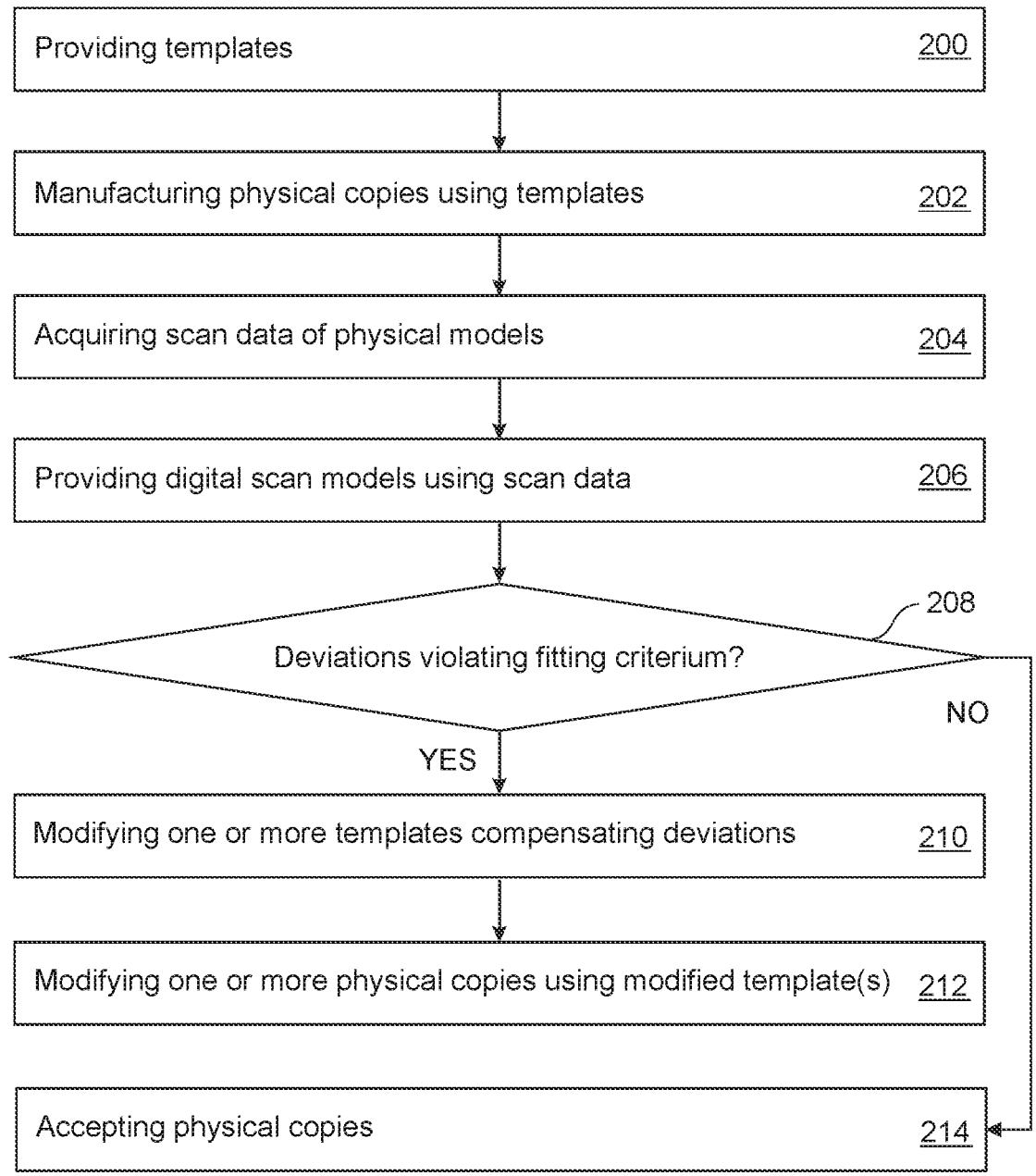

FIG. 1 shows a flowchart illustrating an exemplary method for manufacturing a dental prosthetic assembly. The dental prosthetic assembly to be manufactured comprises at least two elements, i.e., a first and a second element. The first element comprises a first connection portion with a reception, while the second element comprises a second connection portion with a protrusion. First and second connection portions are configured to establish a mechanical connection between the first and the second element. The mechanical connection is established by the reception receiving the protrusion. For example, the first element may be a crown which is put over the second element in form of an abutment. Thus, a mechanical connection may be established between crown and abutment by inserting a protrusion of the abutment into a reception provided by crown.

The exemplary method for manufacturing such a dental prosthetic assembly may comprise in block 200 providing templates for the elements to be manufactured. The providing of the templates may comprise generating the respective templates. A first 3D digital model of the first element may be generated as a first template and a second 3D digital model of the second element may be generated as a second template. The 3D digital models may be generated from scratch or pre-defined models may be provided, which are adjusted to the individual intraoral situation of an individual patient. For example, the abutment may be provided by an abutment library providing different abutments for different artificial teeth provided in form of crowns to be mounted on the abutments. For example, the crown may be selected from a tooth library providing sets of artificial teeth.

For example, a 3D digital model of a patient's intraoral structure may be provided. For example, a 3D digital model of a patient's dentition may be provided. The 3D digital model of the patient's intraoral structure may be generated using scan data. The scan data may be the result of a direct and/or indirect scan of the soft and/or hard tissue of the patient's oral cavity. A direct scan may be an intraoral scan of the patient's mouth, i.e., a scan of soft and/or hard tissues within the patient's oral cavity. An indirect scan may be a scan of an impression of the soft and/or hard tissues of the patient's oral cavity or a scan of a physical model, e.g., a plaster cast model, generated using such an impression. The 3D digital models of the first and the second elements of the dental prosthetic assembly may be generated such that they satisfy the patient's requirements. For example, in case of an amendment and a crown, an implant may be planned to be inserted in one of the patient's jaw bones. For planning a position of the implant, additional scan data may be provided providing information about an inner structure of the patient's jaw bones, like, e.g., scan data acquired using an X-ray scanner and/or a tomography scanner, like a cone beam computed tomography (CBCT) scanner. A desired design of the artificial tooth to be inserted into the patient's dentition may be defined and the abutment as well as the crown may be adjusted to resemble the desired design.

In block 202, physical copies of both elements of the dental prosthetic assembly are manufactured using the templates provided in block 200. A first physical copy of the first element is manufactured using the first template and a second physical copy of the second element is manufactured using the second template. The elements may be manufactured using a CAM-method comprising, e.g., machining and/or 3D printing. In case of a dental prosthetic assembly comprising an abutment and a crown, e.g., the abutment using a 3D digital model of the abutment as a template and the crown using a 3D digital model of the crown as a template are manufactured. Both elements may be manufactured using the same manufacturing method or both elements may be manufactured using different methods of manufacturing.

In block 204, scan data of the manufactured first and second physical copies are acquired. For example, the geometrical form of the manufactured first and second physical copies are scanned using a 3D scanner, e.g., an optical 3D scanner. The acquired scan data is used to provide a first 3D digital scan model of at least a part of the manufactured first physical copy and a second 3D digital scan model of at least a part of the manufactured second physical copy in block 206. The 3D digital scan models may, e.g., comprise the entire manufactured first physical copy and second physical copy, respectively. The first 3D digital scan model may, e.g., comprise only a part, i.e., a subsection of the manufactured first physical copy. For example, the first 3D digital scan model may comprise the first connection portion with the reception, e.g., in case the first element is a crown. The second 3D digital scan model may, e.g., comprise only a part, i.e., a subsection of the manufactured second physical copy. For example, the second 3D digital scan model may comprise the second connection portion with the protrusion, e.g., in case the second element is an abutment.

In block 208, the scan models provided in block 206 are used to determine deviations of the mechanical connection violating one or more fitting criteria, when replacing the templates used for the manufacturing of the physical copies by the scan models. The scan models are used to establish the mechanical connection to be checked in block 208. In case no deviation is determined violating a fitting criterium, the method continues with block 214 and the manufactured first and second physical copies are accepted. For example, an acceptance signal indicating the acceptance of the two physical copies may be generated and provided. The providing of the acceptance signal may comprise an outputting of the respective signal, e.g., in visual and/or acoustic form. For outputting of the acceptance signal, an output device may be used. For example, a visual output device, like a display, may be used to output the acceptance signal in visual form. For example, an acoustic output device, like a loudspeaker, may be used to output the acceptance signal in acoustic form.

In case one or more deviations are determined to violate a fitting criterium, the method continues with block 210 and the compensating of the determined deviations of the mechanical connection such that the one or more violated fitting criteria are satisfied. The compensating may comprises modifying at least the template used for manufacturing the first physical copy or the template used for manufacturing the second physical copy. For example, both templates may be modified.

For example, the mechanical connection, when being established, may define a relative position of the second element with respect to the first element. The fitting criteria may comprise a first maximum value for deviations of the second element from the defined relative position. Thus, in case the first maximum value for deviations of the second element from the position relative to the first element is exceeded, the form of the first and/or the second physical copy may be adjusted such that the relative position of the second element to the first element, when establishing the mechanical connection, is re-adjusted such that all the remaining deviations are smaller than or equal to the first maximum value.

For example, the mechanical connection, when being established, defines a relative orientation of the second element with respect to the first element. The fitting criteria may comprise a second maximum value for deviations of the second element from the defined relative orientation. Thus, in case the second maximum value for deviations of the second element from the orientation relative to the first element is exceeded, the form of the first and/or the of the second physical copy may be adjusted such that the relative position of the second element to the first element, when establishing the mechanical connection, is re-adjusted such that all the remaining deviations are smaller than or equal to the second maximum value.

The determining of the deviations of the mechanical connection may be restricted to selected sections of the mechanical connection. For example, first and second sections may be selected pairwise. The first and second section of each pair comprising a first and second surface facing each other. Thus, deviations may, e.g., be analyzed for first and second surface facing each other.

For example, the mechanical connection, when being established, defines a clearance between the first and second connection portion. The clearance may, e.g., be required for inserting an adhesive between the two elements of the dental prosthetic assembly in order to bond the two elements together. The fitting criteria may require a minimum value of the clearance in order to ensure a sufficient minimum dimension of the clearance. The deviations of the mechanical connection with respect to the clearance may, e.g., be determined between selected first and second sections of the templates.

For example, the fitting criteria may further comprise a maximum value of the clearance in order to ensure that the clearance does not become too large.

For example, not only deviations of the mechanical connection violating fitting criteria may be determined. In addition, one or more fitting criteria may be defined for the manufactured first and/or second physical copy per se. Thus, e.g., deviations of the manufactured first physical copy from the template used for the manufacturing of the first physical copy violating such fitting criteria, may be determined. Thus, e.g., deviations of the manufactured second physical copy from the template used for the manufacturing of the second physical copy violating such fitting criteria, may be determined. Such fitting criteria may, e.g., comprising a maximum value for deviations of the manufactured first physical copy from the first template and/or a maximum value for deviations of the manufactured second physical copy from the second template.

For example, fitting criteria may be position depending. Thus, at different positions of the first and/or second element different fitting criteria may be defined. In particular, at different positions different threshold values may be defined by the fitting criteria.

Thus, the fitting of the manufactured first and second physical copy may be checked. In case, the fitting is insufficient, i.e., deviations of the first and/or second physical copy due to manufacturing inaccuracies exceed per se or in combination with deviations of the second and/or first physical copy a fitting criterium, the first and/or second physical copy may be modified such that the fitting criteria are satisfied.

In block 212, using the one or more modified templates provided in block 210 a modified first and/or second physical copy may be provided. For example, the first and/or second physical copy may be modified. By providing modified first and/or second physical copy according to the modified templates, it may be ensured that all the fitting criteria are satisfied. For example, the first physical copy may be modified according to the first modified template. For example, the second physical copy may be modified according to the second modified template.

The providing of the one or more modified physical copies may, e.g., comprise a re-manufacturing of at least one of the manufactured physical copies, for which the template has been modified. For this re-manufacturing the respective modified template is used.

The providing of the one or more modified physical copies may, e.g., comprise a determining of machining parameters for a subsequent machining of at least one of the manufactured physical copies, for which the template has been modified. The machining parameters are determined using the respective modified templates. In order to modify at least one of the manufactured physical copies, a subsequent machining of the respective physical copy may be executed using the determined machining parameters. For the subsequent machining of the at least one of the manufactured physical copies, e.g., the same machining tool may be used as for the manufacturing of the respective physical copy. Alternatively, a different machining tool may be used, e.g., with a reduced size compared to the machining tool used for the manufacturing of the respective physical copy. Using a machining tool with a reduced size may have the advantage that a more precise machining is possible. Using a machining tool with a larger size for the manufacturing of a physical copy may have the advantage that a faster machining may be possible. However, using a lager machining tool may at the same time increase the risk of potential deviations resulting from the machining which may violate one or more fitting criteria. Using larger machining tools for manufacturing the respective physical copy and smaller machining tools, only if determined necessary, for a subsequent machining in order to compensate deviations violating fitting criteria, may have the advantage that a fast machining may be enabled and at the same time, it may be ensured that all the fitting criteria are satisfied.

Furthermore, an additional check of the fitting of the first and second physical copies even after the modifications may, e.g., be executed. For this purpose, blocks 204 to 208 may be repeated. In case all fitting criteria are satisfied by the physical copies, the respective physical copies may be accepted as in block 214. In case one or more fitting criteria are still violated, blocks 210 and 212 as described above may be repeated. For example, the results of the repeated block 212 may be checked again. This additional checking and modifying may, e.g., be repeated until physical copies are provided, which satisfy all the fitting criteria.

Figure 2:
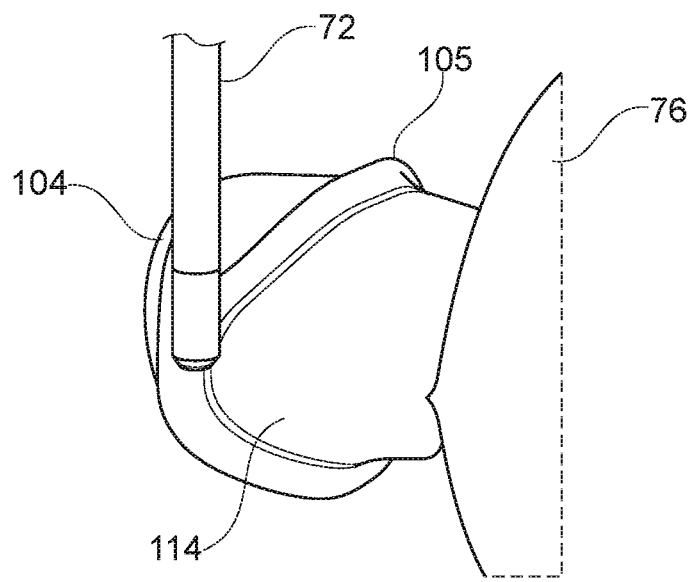
FIG. 2 shows an exemplary abutment being manufactured by machining.

FIG. 2 shows an exemplary element 104 of a dental prosthetic assembly being manufactured by machining. The exemplary element 104 may, e.g., be an abutment. For example, a blank 76 is provided and machined using one or more machining tools 72 according to machining parameters defined according to a template. The template may define a 3D form of the abutment 104 to be manufactured by removing material from the blank 76 using the machining tool 72. The abutment 104 may comprise a protrusion 114 and a rim 105. The protrusion 114 may be configured to be inserted into a reception, e.g., of a crown, when the crown is arranged on the abutment 104. Thus, a mechanical connection may be established between the abutment 104 and, e.g., the crown. The mechanical connection may be established by the reception of the crown receiving the protrusion 114 of the abutment 104. The insertion depth of the protrusion 114 of the abutment 104 may be limited by the rim 105.

Figure 3:
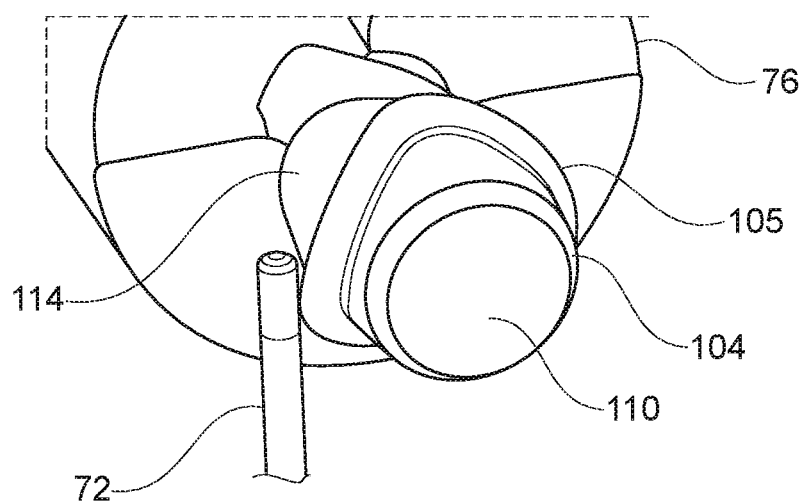
FIG. 3 shows an exemplary abutment being manufactured by machining.

FIG. 3 shows the exemplary abutment 104 of FIG. 2 from another point of view. The abutment 104 may comprise a bottom face 110. This bottom face 110 may be configured for a connection with an implant. For example, a screwing hole may extend through the abutment 104 and the bottom face 110. The screwing hole may be configured for receiving a screw for connecting the abutment 104 to the implant. The bottom face as well as the screwing hole may have no effect on the mechanical connection between the abutment 104 and, e.g., a crown. Therefore, the bottom face 110 and the screwing hole may be neglected for determining potential deviations of the mechanical connection. Since the software knows where exactly the neglected areas, e.g., the screw hole, is in the 3D digital model used as a template for manufacturing the physical copy, like the abutment 104, the software may automatically detect, where the neglected areas are in the milled surface of the physical copy. The detecting may comprise a registration the two digital objects, i.e., of the 3D digital scan model with the 3D digital model used as the template. The registration may, e.g., be an ICP-registration, i.e., a registration using the iterative closest point algorithm to minimize the difference between two clouds of points. Furthermore, the detecting may comprise selecting parts to be neglected in the scan model using a geometric threshold distance to parts defined as being negligible in the template. Parts in the scan model with a geometric distance to negligible parts in the template equal or smaller than the geometric threshold distance may be neglected. The bottom face 110 is depicted as blank face in FIG. 3 and may be considered as a blank face for the purposes of determining potential deviations of the mechanical connection between the abutment 104 and, e.g., the crown. For example, for determine such deviations only the rim 105 and the protrusion 114 of the abutment 104 may be taken into account. Regarding the rim 105, e.g., only a face of the rim 105 facing the crown may be taken into account.

Figure 4:
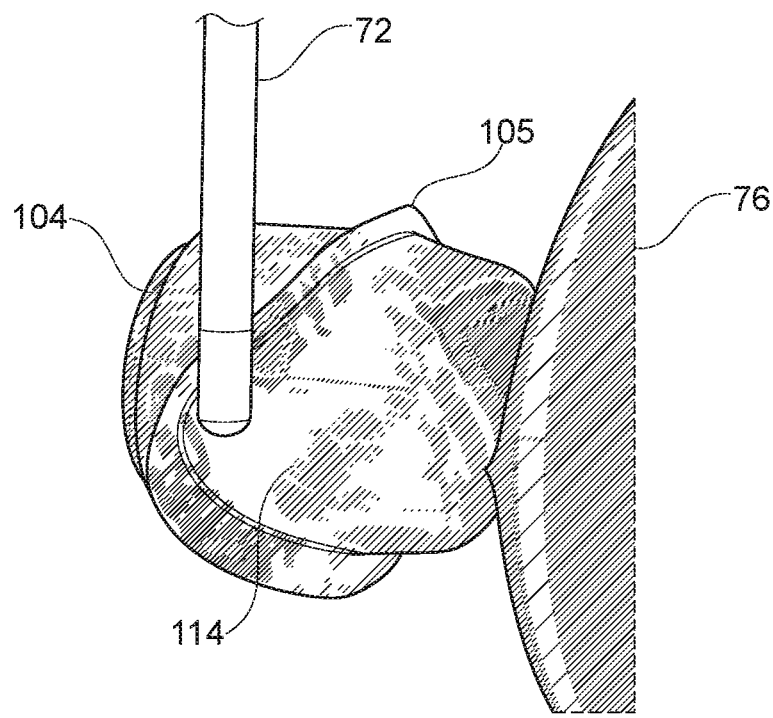
FIG. 4 shows an exemplary abutment being manufactured by machining.

FIG. 4 shows the exemplary abutment 104 of FIG. 2 with deviations of the physical copy of the abutment 104 from the template used for manufacturing the abutment 104 being indicated. For example, the face of the rim 105 facing towards the direction in which the abutment 104 may be inserted into a crown may comprise a deviation 115 from the form defined by the template exceeding a predefined threshold. The deviation 115 of the rim 105 exceeding the predefined threshold may result in a deviation of the mechanical connection between the abutment 104 and, e.g., the crown violating a fitting criterium. This deviation of the mechanical connection resulting from the deviation 115 of the abutment 104 may, e.g., be compensated by modifying a template for the crown. By modifying the template for the crown, the mechanical connection between the abutment 104 and the crown, in particular between the rim 105 and the crown, may be adjusted such that no derivations violating the predefined fitting criteria remain. The crown may be manufactured using the respective modified template.

Figure 5:
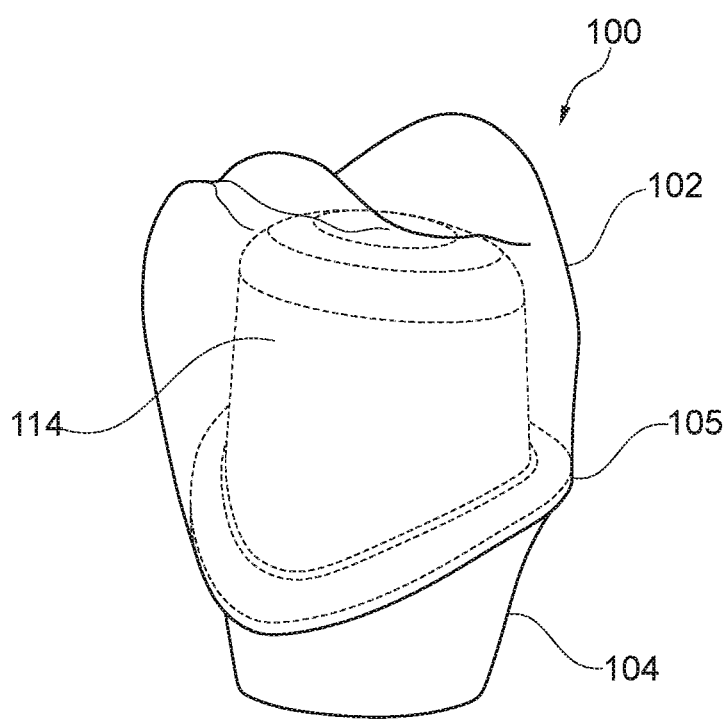
FIG. 5 shows an exemplary dental prosthetic assembly comprising an abutment and a crown.

FIG. 5 shows an exemplary dental prosthetic assembly 100 comprising an abutment 104, like, e.g., the abutment 104 shown in FIG. 2 to 4 as well as and a crown 102. The abutment 104 comprises a protrusion 114, which is configured of be inserted into a reception of the crown 102. In order to establish a mechanical connection between the abutment 104 and the crown 102, the crown 102 may be arranged on the abutment 104, such that the crown 102 receives the protrusion 114. The insertion depth of the protrusion 114 into the crown 102 may be limited by the rim 105 of the abutment.

Figure 6:
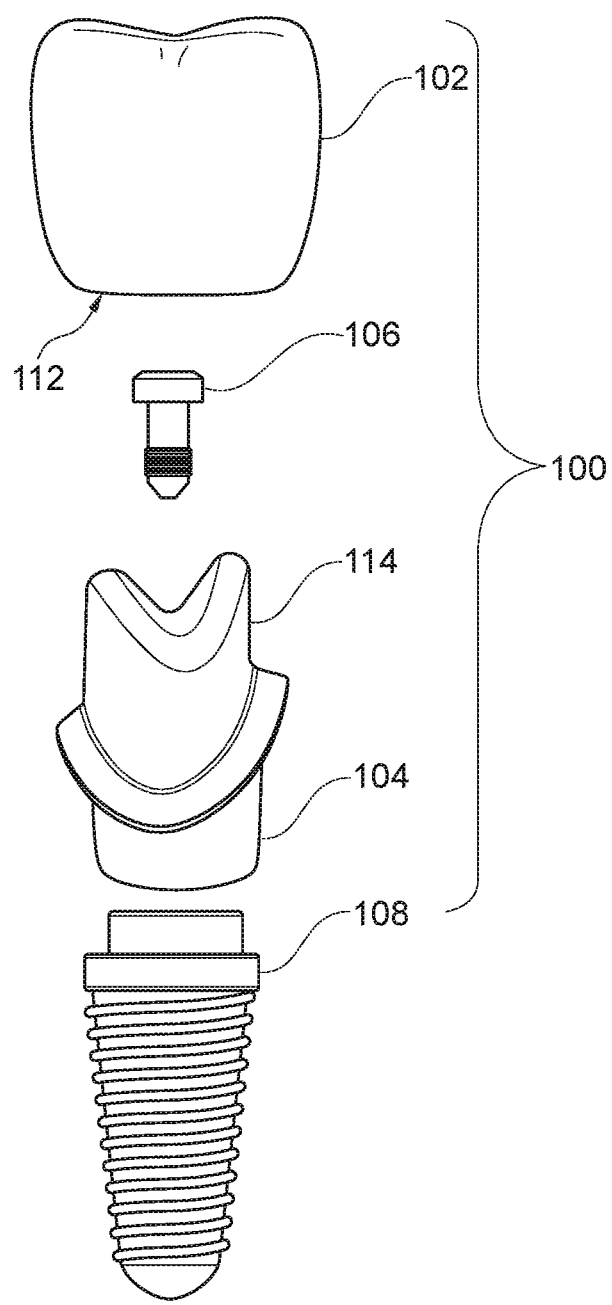
FIG. 6 shows an exemplary dental prosthetic assembly configured to be mounted on an implant using a screw.

FIG. 6 shows exemplary elements 102, 104 of an exemplary dental prosthetic assembly 100 to be mounted onto an implant 108. The implant 108 may be configured to be implanted into a patient's jaw bone. The dental prosthetic assembly 100 may be configured to be mounted on the implant using a screw 106. The screw 106 may be tightened to a predetermined torque with a dental torque wrench, in order to avoid screw loosening, e.g., during chewing. The crown 102 may be arranged on the abutment 104, by inserting the protrusion 114 of the abutment 104 into the reception 112 of the crown 102. For example, the screw 106 may be used to fasten the abutment 104 to the implant 108 before or after establishing a mechanical connection between the abutment 104 and the crown 102, i.e., arranging the crown 102 on the abutment 102. In case the screw 106 is fasten after establishing a mechanical connection, the crown 102 may comprise a channel configured for inserting a screwdriver, e.g., a dental torque wrench, and/or the screw 106. the mechanical connection, when being established, may a clearance between the crown 102 and the abutment 104. This clearance may be configured to receive an adhesive, e.g., dental cement, in order to avoid a loosening of the crown, e.g., during chewing. Thus, a permanent bonding between the crown 102 and the abutment may be established.

Figure 7:
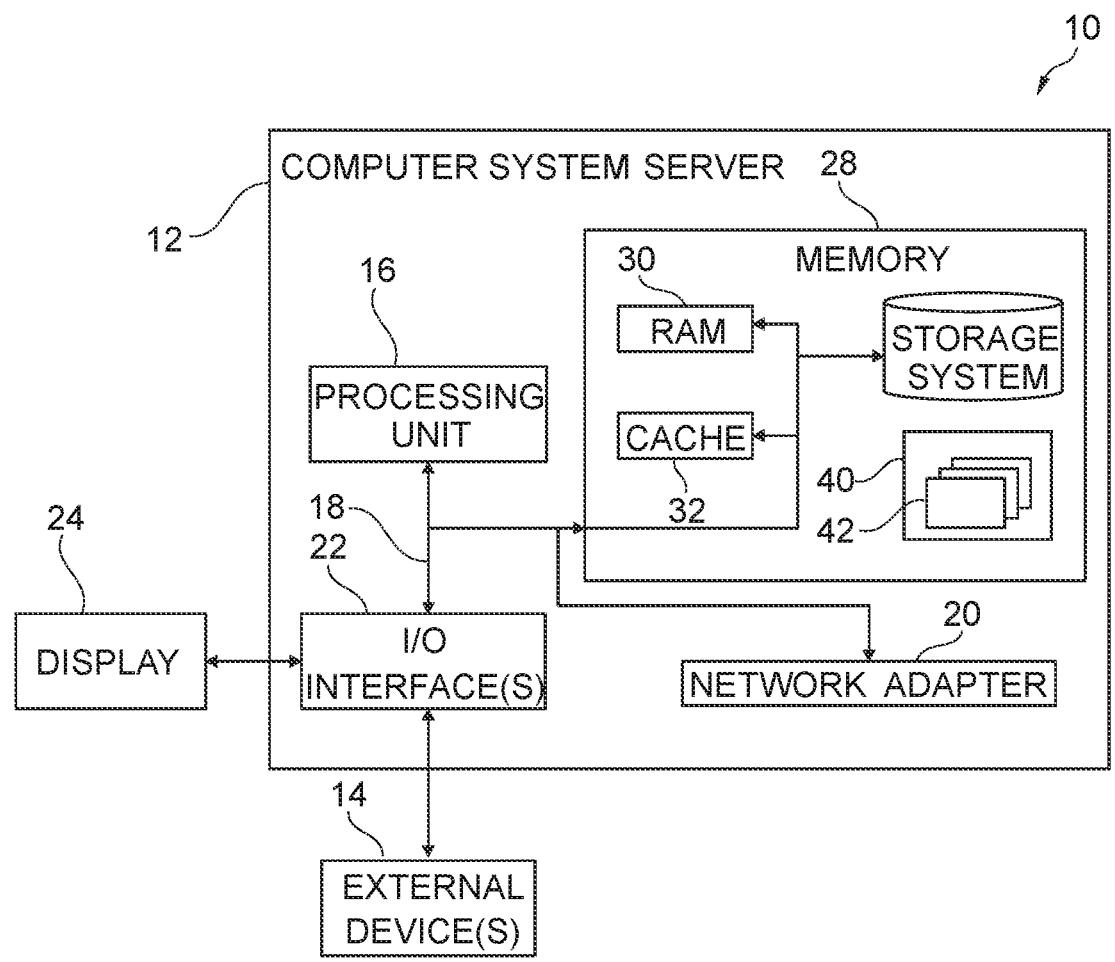
FIG. 7 shows an exemplary computer system for manufacturing a dental prosthetic assembly.

FIG. 7 shows a schematic diagram of an exemplary computer system 10 usable for manufacturing a dental prosthetic assembly. The computer system 10 may be operational with numerous other general-purpose or special-purpose computing system environments or configurations. Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

Figure 8:
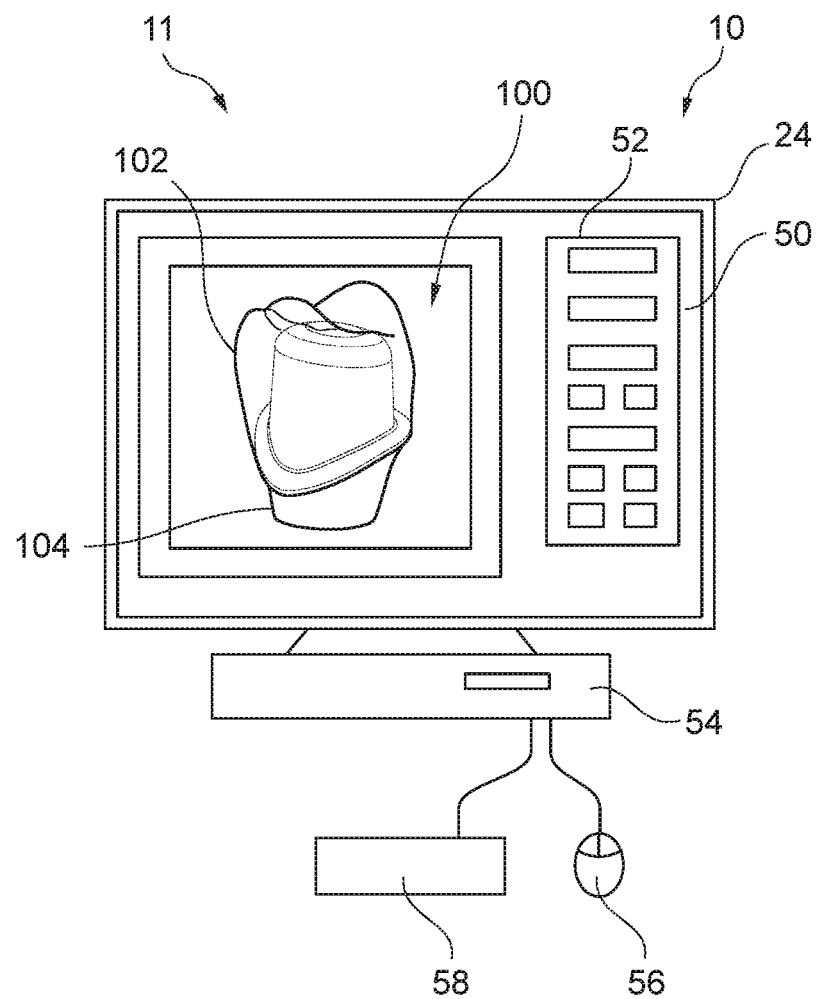
FIG. 8 shows an exemplary computer system for manufacturing a dental prosthetic assembly.

In FIG. 8, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random-access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured for executing one or more steps of the method for manufacturing dental prosthetic assemblies. The respective program module may, e.g., be configured for providing, e.g., generating, 3D digital models of elements of dental prosthetic assemblies, for providing digital 3D scan models of manufactured physical copies of elements of dental prosthetic assemblies, for determining deviations of mechanical connections between elements of dental prosthetic assemblies violating one or more fitting criteria, for compensating deviations violating fitting criteria by modifying templates.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may enable an execution of one or more steps of the method for manufacturing dental prosthetic assemblies.

Computer system 10 may further communicate with one or more external devices 14 such as a keyboard, a pointing device, like a mouse, and a display 24 enabling a user to interact with computer system 10. Such communication can occur via input/output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 7 may be configured for executing one or more steps of the method for manufacturing dental prosthetic assemblies. The respective computer system 10 may, e.g., be configured for providing, e.g., generating, 3D digital models of elements of dental prosthetic assemblies, for providing digital 3D scan models of manufactured physical copies of elements of dental prosthetic assemblies, for determining deviations of mechanical connections between elements of dental prosthetic assemblies violating one or more fitting criteria, for compensating deviations violating fitting criteria by modifying templates. The respective computer system 10 may furthermore be configured for providing control parameters for controlling a manufacturing of elements of dental prosthetic assemblies. These control parameters may, e.g., be used by the computer system 10 to control one or more manufacturing devices, like, e.g., one or more machining devices and/or one or more 3D printing devices. The respective computer system 10 may furthermore be configured to control one or more scan devices configured for acquiring scan data of physical copies of elements of dental prosthetic assemblies. The computer system 10 may be a standalone computer with no network connectivity that may receive data to be processed through a local interface. The data received by computer system 10 may for example comprise 3D digital models of elements of dental prosthetic assemblies and/or scan data of physical copies of elements of dental prosthetic assemblies. For example, the computer system 10 may be used to generate 3D digital models of elements of dental prosthetic assemblies. Such operation may, however, likewise be performed using a computer system that is connected to a network such as a communications network and/or a computing network.

FIG. 8 shows an exemplary system 11 comprising a computer system 10 for executing steps of the method for manufacturing dental prosthetic assemblies 100. The computer system 10 may, e.g., be configured as shown in FIG. 7. The computer system 10 may comprise a hardware component 54 comprising one or more processors as well as a memory storing machine-executable program instructions. Execution of the program instructions by the one or more processors may cause the one or more processors to control the computer system 10 to execute one or more steps of the method for manufacturing a dental prosthetic assembly 100. The dental prosthetic assembly 100 may comprise a first and a second element 102, 104. As an example for a first element 102 of a dental assembly 100, FIG. 8 depicts a crown. As an example for a second element 104 of a dental assembly 100, FIG. 8 depicts an abutment. The first element 102 may comprise a first connection portion with a reception configured to establish a mechanical connection between the first and the second element 102, 104 by receiving a protrusion of a second connection portion comprised by the second element 104.

The method may comprise providing, e.g., generating a first 3D digital model of the first element 102 as a first template and a second 3D digital model of the second element 104 as a second template. A first physical copy of the first element 102 may be manufactured using the first template and a second physical copy of the second element 104 using the second template. Scan data of the manufactured first and second physical copy may be acquired. A first 3D digital scan model of the manufactured first physical copy and a second 3D digital scan model of the manufactured second physical copy may be provided using the scan data. Using the first and second scan model deviations of the mechanical connection violating one or more fitting criteria may be determined, when replacing the templates by the scan models for establishing the mechanical connection. The determined deviations of the mechanical connection may be compensated to satisfy the one or more violated fitting criteria. The compensating may comprise at least one of the following: modifying the first template and modifying the second template. The one or more modified templates may be used for providing one or more modified physical copies.

The computer system 10 may further comprise one or more input devices, like a keyboard 54 and a mouse 56, enabling a user to interact with the computer system 10. Furthermore, the computer system 10 may comprise one or more output devices, like a display 24 providing a graphical user interface 50 with control elements 52, e.g., GUI elements, enabling the user to control a generating of 3D digital models of the elements 102, 104 of the dental prosthetic assembly 100 and/or a manufacturing of the elements 102, 104 of the dental prosthetic assembly 100.

Figure 9:
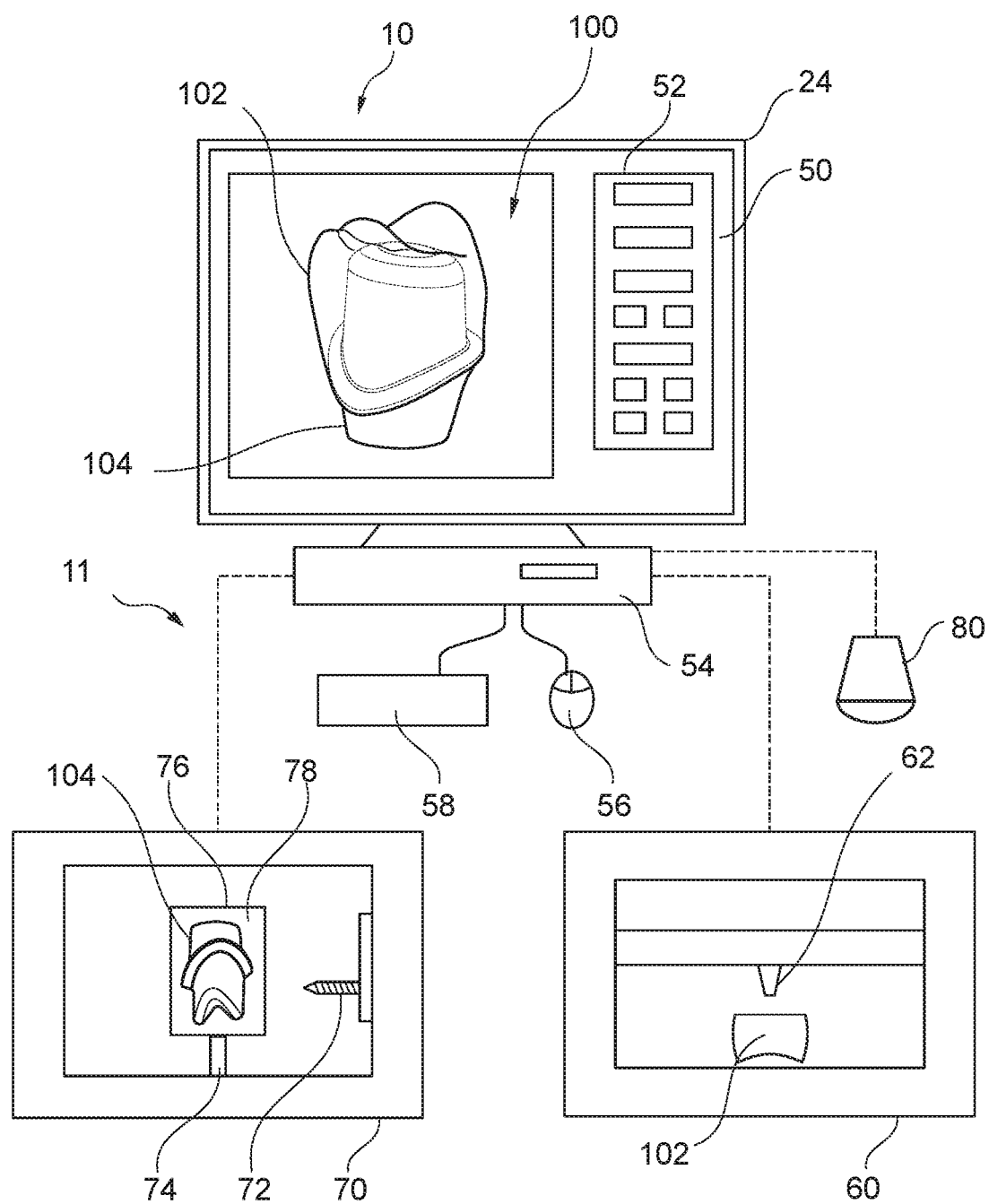
FIG. 9 shows an exemplary system for manufacturing a dental prosthetic assembly.

FIG. 9 shows an exemplary system 11 for manufacturing a dental prosthetic assembly 100 comprising a first element 102, e.g., a crown, and a second element 104, e.g., an abutment. The system 11 may comprise the computer system 10 of FIG. 8. The computer system 10 may further be configured to control one or more manufacturing devices 60, 70. For example, the system 11 may comprise a manufacturing device in form of a machining device 70 controlled by the computer system 10. The machining device 70 may be configured to machining a blank 76 using one or more machining tools 72. The blank 76 of raw material 78 may be provided using a holding device 74 and cut into a desired final shape and size of the dental element to be manufactured, e.g., the first and/or second element 102, 104 of the dental prosthetic assembly 100, using the one or more machining tools 72 for executing a controlled material-removal process. The machining tool 72 may, e.g., be a milling tool. Digital 3D models, e.g., the first and/or second element 102, 104, may provide templates of the dental elements manufactured using the machining device 70, e.g., the first and/or second element 102, 104 of the dental prosthetic assembly 100.

For example, the system 11 may comprise a manufacturing device in form of a 3D printing device 60. The 3D printing device 60 may be controlled by the computer system 10 and configured to print one or more dental element to be manufactured, e.g., the first and/or second element 102, 104 of the dental prosthetic assembly 100. The 3D printing device 60 may comprise a printing element 62 configured to print the respective dental element, like the first and/or second element 102, 104, layer by layer. Digital 3D models, e.g., the first and/or second element 102, 104, may provide templates of the dental elements manufactured using the 3D printing device 60, e.g., the first and/or second element 102, 104 of the dental prosthetic assembly 100.

Furthermore, the system 11 may comprise one or more scan devices 80, i.e., scanners, configured for acquiring scan data of physical copies of elements 102, 104 of dental prosthetic assemblies 100 manufactured using the system 11. The scan data, e.g., scan data of physical copy of an element 102, 104 may be used for providing a 3D digital scan model of at least a part of the respective physical copy of element 102, 104. The template used for the manufacturing the respective physical copy of element 102, 104. May be replaced at least partially by the scan model for determining deviations of the mechanical connection using the scan model violating one or more fitting criteria. This scan device 80 may, e.g., comprise an optical scanner configured for performing an optical scan of a surface of a manufactured element 102, 104 of a dental prosthetic assembly 100. The scan device 80 may, e.g., comprise another type of scanner suitable for acquiring scan data of manufactured elements 102, 104 of dental prosthetic assemblies 100. The scan device 80 may, e.g., comprise an X-ray scanner.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A method for manufacturing a dental prosthetic assembly, the dental prosthetic assembly comprising a first and a second element,
   the first element comprising a first connection portion with a reception configured to establish a mechanical connection between the first and the second element by receiving a protrusion of a second connection portion comprised by the second element,
   the method comprising:
      providing a first 3D digital model of the first element as a first template and a second 3D digital model of the second element as a second template,
      manufacturing a first physical copy of the first element using the first template and a second physical copy of the second element using the second template, acquiring scan data of the manufactured first and second physical copy,
providing a first 3D digital scan model of the manufactured first physical copy and a second 3D digital scan model of the manufactured second physical copy using the scan data,
determining using the first and second scan model deviations of the mechanical connection violating one or more fitting criteria, when replacing for establishing the mechanical connection the templates by the scan models,
compensating the determined deviations of the mechanical connection to satisfy the one or more violated fitting criteria, wherein the compensating comprises at least one of the following: modifying the first template and modifying the second template,
using the one or more modified templates for providing one or more modified physical copies.

2. The method of feature combination 1, wherein the providing of the one or more modified physical copies comprises re-manufacturing at least one of the manufactured physical copies, for which the template is modified, using the respective modified template.

3. The method of any of the preceding feature combinations, wherein the providing of the one or more modified physical copies comprises:
determining machining parameters for a subsequent machining of at least one of the manufactured physical copies, for which the template is modified, using the respective modified template,
subsequent machining of at least one of the manufactured physical copies, for which the template is modified, using the determined machining parameters.

4. The method of feature combination 3, wherein for the subsequent machining of the at least one of the manufactured physical copies the same machining tool is used as for the manufacturing of the respective physical copy or a different machining tool is used with a reduced size compared to the machining tool used for the manufacturing of the respective physical copy.

5. The method of any of the preceding feature combinations, wherein the mechanical connection, when being established, defines a relative position of the second element with respect to the first element, wherein the fitting criteria comprise a first maximum value for deviations of the second element from the defined relative position.

6. The method of any of the preceding feature combinations, wherein the mechanical connection, when being established, defines a relative orientation of the second element with respect to the first element, wherein the fitting criteria comprise a second maximum value for deviations of the second element from the defined relative orientation.

7. The method of any of the preceding feature combinations, wherein the determining of the deviations of the mechanical connection is restricted to selected sections of the mechanical connection comprising one or more of the following: a set of one or more selected first sections of the first connection portion, a set of one or more selected second sections of the second connection portion.

8. The method of feature combination 7, wherein the selected one or more first sections cover the entire first connection portion.

9. The method of feature combination 7, wherein the selected one or more first sections cover one or more sub-portions of the first connection portion with one or more sub-portions of the first connection portion remaining uncovered.

10. The method of any of the feature combinations 7 to 9, wherein the selected one or more second sections cover the entire second connection portion.

11. The method of any of the feature combinations 7 to 9, wherein the selected one or more second sections cover one or more sub-portions of the second connection portion with one or more sub-portions of the second connection portion remaining uncovered.

12. The method of any of the feature combinations 7 to 11, wherein the selected first and second sections are selected pairwise, the first and second section of each pair comprising a first and second surface facing each other.

13. The method of any of the feature combinations 7 to 12, wherein image pattern recognition is used for selecting the first and second sections, the image pattern recognition being one of the following: a 2D image pattern recognition, a 3D image pattern recognition.

14. The method of any of the preceding feature combinations, wherein the mechanical connection, when being established, defines a clearance between the first and second connection portion, the fitting criteria comprising a minimum value of the clearance.

15. The method of feature combination 14, deviations of the mechanical connection with respect to the clearance being determined between the selected first and second sections of the templates.

16. The method of any of the feature combinations 14 to 15, wherein the fitting criteria further comprise a maximum value of the clearance.

17. The method of any of the preceding feature combinations, further comprising determining using the acquired scan data deviations of the manufactured first physical copy from the first template violating the fitting criteria, the fitting criteria further comprising a first maximum value of the deviations of the manufactured first physical copy.

18. The method of feature combination 17, wherein the determining of the deviations violating the first maximum value is restricted to one or more selected third sections of the first template.

19. The method of feature combination 18, wherein for the determining of the deviations first scan data of the selected third sections of the manufactured first physical copy is selected from the acquired scan data.

20. The method of feature combination 19, wherein image pattern recognition is used for selecting the first scan data, the image pattern recognition being one of the following: a 2D image pattern recognition, a 3D image pattern recognition.

21. The method of any of the preceding feature combinations, further comprising determining using the acquired scan data deviations of the manufactured second physical copy from the second template violating the fitting criteria, the fitting criteria further comprising a second maximum value of the deviations of the manufactured second physical copy.

22. The method of feature combination 21, wherein the determining of the deviations violating the second maximum value is restricted to one or more selected fourth sections of the second template.

23. The method of feature combination 22, wherein for the determining of the deviations second scan data of the selected fourth sections of the manufactured second physical copy is selected from the acquired scan data.

24. The method of feature combination 23, wherein image pattern recognition is used for selecting the second scan data, the image pattern recognition being one of the following: a 2D image pattern recognition, a 3D image pattern recognition.

25. The method of any of the preceding feature combinations, wherein one or more of the fitting criteria are position depending.

26. The method of any of the preceding feature combinations, wherein the first and second connection portions comprise one or more of the following of the first and second connection portion: a ridge, a notch, a rim, an edge, a hole.

27. The method of any of the preceding feature combinations, wherein the determining of the deviations comprises a registration of the first and second scan model with the first and second template.

28. The method of feature combination 27, wherein image pattern recognition is used for the registration of the first and second scan model with the first and second template, the image pattern recognition being one of the following: a 2D image pattern recognition, a 3D image pattern recognition.

29. The method of feature combination 28, wherein the first and second scan model are registered with the first and second template directly.

30. The method of feature combination 28, wherein the first and second scan model are registered with the templates indirectly comprising:
    defining a position of the first and second template within a fifth 3D digital model of at least a part of a dentition of a patient,
    arranging the first and second scan model in the fifth 3D digital model at the predefined position within the fifth 3D digital model.

31. The method of any of the feature combinations 28 to 30, wherein the first and second template comprise markers, wherein the first and second physical copies comprise copies of the markers, the markers being used for the registration of the scan model with the templates.

32. The method of any of the preceding feature combinations, wherein the first and second physical copy are manufactured using at least one of the following: machining, 3D printing.

33. The method of any of the preceding feature combinations, wherein the second element is an abutment and the first element is one of the following: a crown, an abutment tooth of a bridge, an abutment tooth of a partial removable denture.

34. The method of any of the preceding feature combinations, wherein the second element is a bar and the first element is one of the following: a bar denture, a part of a bar denture.

35. A computer program product for manufacturing a dental prosthetic assembly, the dental prosthetic assembly comprising a first and a second element,
    the first element comprising a first connection portion with a reception configured to establish a mechanical connection between the first and the second element by receiving a protrusion of a second connection portion comprised by the second element,
    the computer program product comprising a computer readable storage medium having program instructions embodied therewith, the program instructions being executable by a processor of a computer device of a manufacturing system to cause the computer device to control the manufacturing system to:
        provide a first 3D digital model of the first element as a first template and a second 3D digital model of the second element as a second template,
        manufacture a first physical copy of the first element using the first template and a second physical copy of the second element using the second template,
        acquire scan data of the manufactured first and second physical copy,
        provide a first 3D digital scan model of the manufactured first physical copy and a second 3D digital scan model of the manufactured second physical copy using the scan data,
        determine using the first and second scan model deviations of the mechanical connection violating one or more fitting criteria, when replacing for establishing the mechanical connection the templates by the scan models,
        compensate the determined deviations of the mechanical connection to satisfy the one or more violated fitting criteria, wherein the compensating comprises at least one of the following: modifying the first template and modifying the second template,
        use the one or more modified templates for providing one or more modified physical copies.

36. A manufacturing system for manufacturing a dental prosthetic assembly, the dental prosthetic assembly comprising a first and a second element,
    the first element comprising a first connection portion with a reception configured to establish a mechanical connection between the first and the second element by receiving a protrusion of a second connection portion comprised by the second element,
    the manufacturing system comprising a computer device and one or more manufacturing devices, the computer device comprising a processor and a memory storing program instructions executable by the processor, execution of the program instructions by the processor causing the computer device to control the manufacturing system using the manufacturing device to:
        provide a first 3D digital model of the first element as a first template and a second 3D digital model of the second element as a second template,
        manufacture a first physical copy of the first element using the first template and a second physical copy of the second element using the second template,
        acquire scan data of the manufactured first and second physical copy,
        provide a first 3D digital scan model of the manufactured first physical copy and a second 3D digital scan model of the manufactured second physical copy using the scan data,
        determine using the first and second scan model deviations of the mechanical connection violating one or more fitting criteria, when replacing for establishing the mechanical connection the templates by the scan models,
        compensate the determined deviations of the mechanical connection to satisfy the one or more violated fitting criteria, wherein the compensating comprises at least one of the following: modifying the first template and modifying the second template,
        use the one or more modified templates for providing one or more modified physical copies.

37. The manufacturing system of feature combination 36, wherein the manufacturing devices comprise one or more of the following: a machining device, a 3D printing device.

| List of reference numerals |
|---|
| 10 computer system |
| 11 system |
| 14 external device |
| 16 processing unit |
| 18 bus |
| 20 network adapter |
| 22 I/O interface |
| 24 display |
| 28 memory |
| 30 RAM |
| 32 cache |
| 34 storage system |
| 40 program |
| 42 program module |
| 50 user interface |
| 52 control elements |
| 54 hardware device |
| 56 keyboard |
| 58 mouse |
| 60 3D printing device |
| 62 printing element |
| 70 machining device |
| 72 machining tool |
| 74 holding device |
| 76 blank |
| 78 raw material |
| 80 scan device |
| 100 dental prosthetic assembly |
| 102 crown |
| 104 abutment |
| 105 rim |
| 106 screw |
| 108 implant |
| 110 neglected surface |
| 112 reception |
| 114 protrusion |
| 116 deviation |

The invention claimed is:

1. A method for manufacturing a dental prosthetic assembly, the dental prosthetic assembly comprising a first and a second element, the first element comprising a first connection portion with a reception configured to establish a mechanical connection between the first and the second element by receiving a protrusion of a second connection portion comprised by the second element, the method comprising:
providing a first 3D digital model of the first element as a first template and a second 3D digital model of the second element as a second template,
manufacturing a first physical copy of the first element using the first template and a second physical copy of the second element using the second template,
acquiring scan data of the manufactured first and second physical copy,
providing a first 3D digital scan model of the manufactured first physical copy and a second 3D digital scan model of the manufactured second physical copy using the scan data,
determining using the first and second scan model deviations of the mechanical connection violating one or more fitting criteria, when replacing for establishing the mechanical connection the templates by the scan models, wherein the determining of the deviations comprises a registration of the first and second scan model with the first and second template, which are arranged in the mechanical connection, wherein image pattern recognition is used for the registration of the first and second scan model with the first and second template, compensating the determined deviations of the mechanical connection to satisfy the one or more violated fitting criteria, wherein the compensating comprises at least one of the following: modifying the first template and modifying the second template,
using the one or more modified templates for providing one or more modified physical copies.

2. The method of claim 1, wherein the providing of the one or more modified physical copies comprises re-manufacturing at least one of the manufactured physical copies, for which the template is modified, using the respective modified template.

3. The method of claim 1, wherein the providing of the one or more modified physical copies comprises:
determining machining parameters for a subsequent machining of at least one of the manufactured physical copies, for which the template is modified, using the respective modified template,
subsequent machining of at least one of the manufactured physical copies, for which the template is modified, using the determined machining parameters.

4. The method of claim 3, wherein for the subsequent machining of the at least one of the manufactured physical copies a same machining tool is used as for the manufacturing of the respective physical copy or a different machining tool is used with a reduced size compared to the machining tool used for the manufacturing of the respective physical copy.

5. The method of claim 1, wherein the mechanical connection, when being established, defines a relative position of the second element with respect to the first element, wherein the fitting criteria comprise a first maximum value for deviations of the second element from the defined relative position.

6. The method of claim 1, wherein the mechanical connection, when being established, defines a relative orientation of the second element with respect to the first element, wherein the fitting criteria comprise a second maximum value for deviations of the second element from the defined relative orientation.

7. The method of claim 1, wherein the determining of the deviations of the mechanical connection is restricted to selected sections of the mechanical connection comprising one or more of the following: a set of one or more selected first sections of the first connection portion, a set of one or more selected second sections of the second connection portion.

8. The method of claim 7, wherein the selected one or more first sections cover the entire first connection portion.

9. The method of claim 7, wherein the selected one or more first sections cover one or more sub-portions of the first connection portion with one or more sub-portions of the first connection portion remaining uncovered.

10. The method of claim 7, wherein the selected one or more second sections cover the entire second connection portion.

11. The method of claim 7, wherein the selected one or more second sections cover one or more sub-portions of the second connection portion with one or more sub-portions of the second connection portion remaining uncovered.

12. The method of claim 7, wherein the selected first and second sections are selected pairwise, the first and second section of each pair comprising a first and second surface facing each other.

13. The method of claim 7, wherein image pattern recognition is used for selecting the first and second sections, the image pattern recognition being one of the following: a 2D image pattern recognition, a 3D image pattern recognition.

14. The method of claim 1, wherein the mechanical connection, when being established, defines a clearance between the first and second connection portion, the fitting criteria comprising a minimum value of the clearance.

15. The method of claim 14, deviations of the mechanical connection with respect to the clearance being determined between the selected first and second sections of the templates.

16. The method of claim 14, wherein the fitting criteria further comprise a maximum value of the clearance.

17. The method of claim 1, further comprising determining using the acquired scan data deviations of the manufactured first physical copy from the first template violating the fitting criteria, the fitting criteria further comprising a maximum value of the deviations of the manufactured first physical copy.

18. The method of claim 17, wherein the deviations of the manufactured first physical copy are determined within the selected first sections of the first template violating one or more fitting criteria.

19. The method of claim 18, wherein for the determining of the deviations first scan data of the selected first sections of the manufactured first physical copy is selected from the acquired scan data.

20. The method of claim 19, wherein image pattern recognition is used for selecting the first scan data, the image pattern recognition being one of the following: a 2D image pattern recognition, a 3D image pattern recognition.

21. The method of claim 1, further comprising determining using the acquired scan data deviations of the manufactured second physical copy from the second template violating the fitting criteria, the fitting criteria further comprising a maximum value of the deviations of the manufactured second physical copy.

22. The method of claim 21, wherein the deviations of the manufactured second physical copy are determined within the selected second sections of the second template violating one or more fitting criteria.

23. The method of claim 22, wherein for the determining of the deviations second scan data of the selected second sections of the manufactured second physical copy is selected from the acquired scan data.

24. The method of claim 23, wherein image pattern recognition is used for selecting the second scan data, the image pattern recognition being one of the following: a 2D image pattern recognition, a 3D image pattern recognition.

25. The method of claim 1, wherein one or more of the fitting criteria are position dependent.

26. The method of claim 1, wherein the first and second connection portions comprise one or more of the following of the first and second connection portion: a ridge, a notch, a rim, an edge, a hole.

27. The method of claim 1, wherein the image pattern recognition is one of the following: a 2D image pattern recognition, a 3D image pattern recognition.

28. The method of claim 27, wherein the first and second scan model are registered with the first and second template directly.

29. The method of claim 27, wherein the first and second scan model are registered with the templates indirectly comprising:
defining a position of the first and second template within a fifth 3D digital model of at least a part of a dentition of a patient,
arranging the first and second scan model in the fifth 3D digital model at the predefined position within the fifth 3D digital model.

30. The method of claim 27, wherein the first and second template comprise markers, wherein the first and second physical copies comprise copies of the markers, the markers being used for the registration of the scan model with the templates.

31. The method of claim 1, wherein the first and second physical copy are manufactured using at least one of the following: machining, 3D printing.

32. The method of claim 1, wherein the second element is an abutment and the first element is one of the following: a crown, an abutment tooth of a bridge, an abutment tooth of a partial removable denture.

33. The method of claim 1, wherein the second element is a bar and the first element is one of the following: a bar denture, a part of a bar denture.

34. A non-transitory computer-readable storage medium having program instructions stored thereon, the program instructions being executable by a processor of a computer device of a manufacturing system for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the program instructions causing the computer device to control the manufacturing system to:
provide a first 3D digital model of the first element as a first template and a second 3D digital model of the second element as a second template,
manufacture a first physical copy of the first element using the first template and a second physical copy of the second element using the second template,
acquire scan data of the manufactured first and second physical copy,
provide a first 3D digital scan model of the manufactured first physical copy and a second 3D digital scan model of the manufactured second physical copy using the scan data,
determine using the first and second scan model deviations of the mechanical connection violating one or more fitting criteria, when replacing for establishing the mechanical connection the templates by the scan models, wherein the determining of the deviations comprises a registration of the first and second scan model with the first and second template, which are arranged in the mechanical connection, wherein image pattern recognition is used for the registration of the first and second scan model with the first and second template,
compensate the determined deviations of the mechanical connection to satisfy the one or more violated fitting criteria, wherein the compensating comprises at least one of the following: modifying the first template and modifying the second template,
use the one or more modified templates for providing one or more modified physical copies.

35. A manufacturing system for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element, the manufacturing system comprising a computer device and one or more manufacturing devices, the computer device comprising a processor and a memory storing program instructions executable by the processor, execution of the program instructions by the processor causing the computer device to control the manufacturing system using the manufacturing device to:

provide a first 3D digital model of the first element as a first template and a second 3D digital model of the second element as a second template, manufacture a first physical copy of the first element using the first template and a second physical copy of the second element using the second template, acquire scan data of the manufactured first and second physical copy, provide a first 3D digital scan model of the manufactured first physical copy and a second 3D digital scan model of the manufactured second physical copy using the scan data, determine using the first and second scan model deviations of the mechanical connection violating one or more fitting criteria, when replacing for establishing the mechanical connection the templates by the scan models, wherein the determining of the deviations comprises a registration of the first and second scan model with the first and second template, which are arranged in the mechanical connection, wherein image pattern recognition is used for the registration of the first and second scan model with the first and second template, compensate the determined deviations of the mechanical connection to satisfy the one or more violated fitting criteria, wherein the compensating comprises at least one of the following: modifying the first template and modifying the second template, use the one or more modified templates for providing one or more modified physical copies.

36. The manufacturing system of claim 35, wherein the manufacturing devices comprise one or more of the following: a machining device, a 3D printing device.

* * * * *